June 23, 1936.    O. MUELLER    2,045,483
SAFETY DEVICE FOR CLUTCHES
Filed Dec. 9, 1935
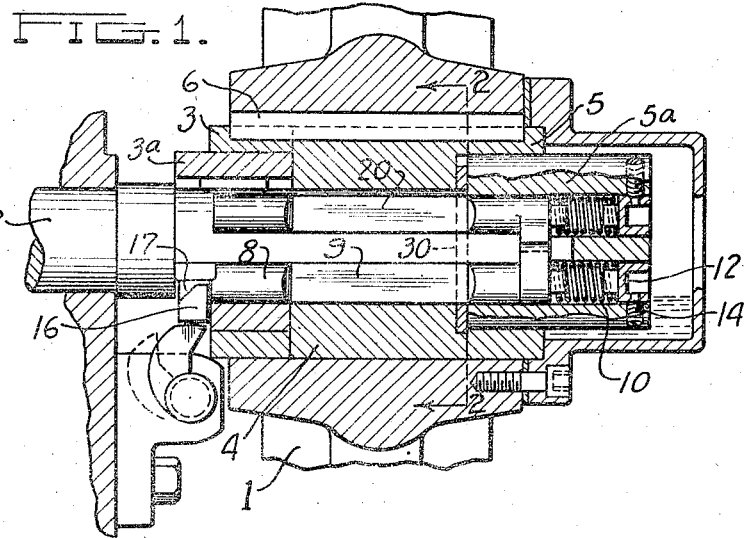
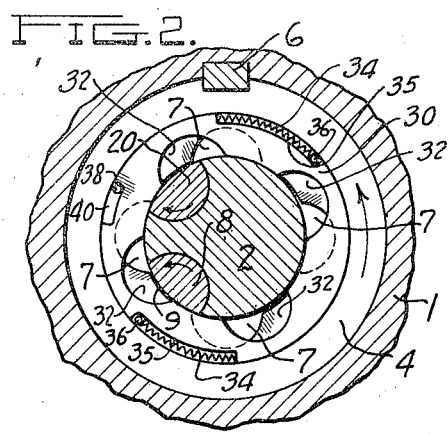
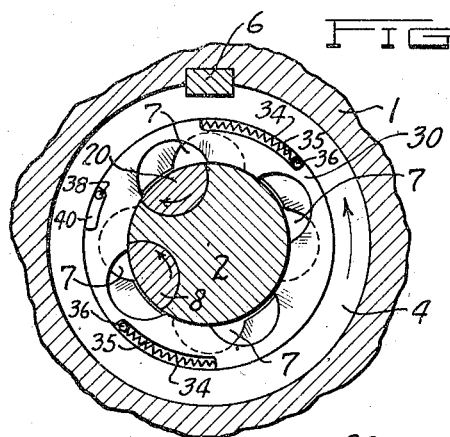
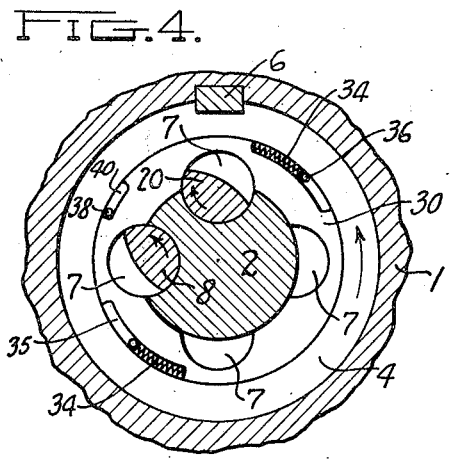
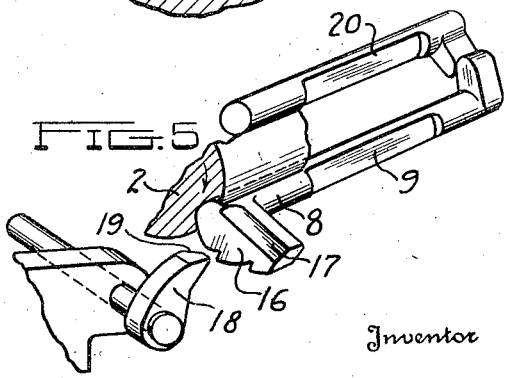
Inventor
Otto Mueller
By Owen & Owen
Attorneys Patented June 23, 1936

2,045,483

UNITED STATES PATENT OFFICE 2,045,483

SAFETY DEVICE FOR CLUTCHES

Otto Mueller, Toledo, Ohio, assignor to E. W. Bliss Company, Brooklyn, N. Y., a corporation of West Virginia Application December 9, 1935, Serial No. 53,605

4 Claims. (Cl. 192—29)

This invention relates to a safety device for clutches, and is particularly applicable to clutches of the rolling key type.

The primary object of the invention is the provision of means to control the engagement of a pawl element in a clutch of the rolling key type.

Another object of the invention is the provision, in a rolling key clutch, of a device which will effectively prevent a partial engagement of the clutch elements and thus obviate the possibility of damaging the engaging surfaces.

Other objects and advantages of the invention will become apparent as the description proceeds, reference being had to the accompanying drawing, in which—

Figure 1 is an assembly view, with parts broken away and parts in section, of a clutch embodying the present invention; Fig. 2 is a section on line 2—2 of Fig. 1; Figs. 3 and 4 are views similar to Fig. 2, with the parts in other positions; and Fig. 5 is a fragmentary perspective view of the clutch pawls and actuating means.

Referring to the drawing, the present invention is directed to a control device for a clutch interposed between a driving member 1 and a driven member 2, which may comprise the fly wheel and crank shaft of a power press in which intermittent driving movements of the shaft 2 are to be imparted from the fly wheel.

The clutch and its actuating elements form no part of the present invention except as they enter into combination with the parts hereinafter described.

The wheel 1 is provided internally of its hub with bushing elements 3, 4 and 5, the outer pair 3 and 5 of which ride on bearings 3ª and 5ª, respectively, fixedly carried by the shaft 2. These bushings are fixed to the wheel by a key 6 so as to rotate therewith.

The central bushing 4 is provided with a plurality of spaced, semi-cylindrical, grooves 7 which constitute the engaging surfaces of the wheel side of the clutch. A driving key or pawl 8 is adapted to be turned into and out of engagement with the walls of a registering groove 7 in a manner hereinafter described, and furnishes the driving connection between the shaft 2 and the wheel. The pawl or key 8, as shown in Fig. 5, comprises a cylindrical member mounted in a suitable recess in the shaft and at its ends in recesses in the respective bearing collars 3ª and 5ª, so as to be free to turn to a limited extent on its own axis, parallel to the axis of the driven shaft 2. Intermediate its ends, the pawl 8 is cut away so that its outer surface is curved on a radius coinciding with the radius of the driven shaft 2 in which the key is seated so that in one position of its movement the center part of the key will lie flush with the adjacent shaft surfaces and form a continuation of the latter. As shown in Fig. 1, the reduced portion of the pawl is confined substantially to the central part axially coextensive with the wheel bushing 4.

The pawl 8 is urged to turn in its seat by a torsion spring 10 received in a recess in the end of shaft 2, being held in stressed position by a plug 12. The plug 12 is kept from turning by a suitable set screw 14.

At its inner end the pawl 8 is provided with a clutch hook 16 projecting radially therefrom and adapted to strike a latch 18 operated in any well known manner so as to be thrown into and out of the path of travel of the clutch hook 16. It will be seen that when the clutch hook strikes the latch, the latter will cause the pawl 8 to be turned in its seat against the tension of the spring 10.

When the clutch is in disengaged position, by reason of the hook 16 striking and resting on the latch 18, the pawl 8 assumes the position shown in Fig. 2 with its intermediate reduced surface 9 flush with the surface of the shaft 2. With the parts in this position, the wheel is free to rotate on the shaft.

When it is desired to engage the clutch so as to drive the shaft 2 from the wheel, the latch 18 is released, so that the spring 10 will urge the pawl 8 to turn in its seat to the position shown in Fig. 4, which position represents full engagement between the pawl and the groove 7 in the wheel bushing 4.

With certain presses in which a very heavy slide is used or in which for some other reason the slide tends to slip and move faster than the wheel, a means to effectually lock the two parts together against movement in both directions is essential. For this reason, a backing pawl 20 is provided, but forms no part of the present invention. This backing pawl enters one of the grooves 7 of the wheel bushing 4 upon rotating in a direction opposite to the direction of the driving pawl 8, in a manner well known in the art.

It has been found in use that occasionally the operator will trip the latch 18 when one of the wheel bushing grooves 7 has nearly passed the leading edge of the pawl 8 so that the pawl actuating spring has a chance to turn the pawl only slightly in its seat before the rear surface of the groove engages the pawl. Due to this, the pawl does not get a full engagement with the wheel bushing, but works only on a very small surface. While the parts may drive in this position, the condition may be reduced to such an extreme that the wheel bushing will round off the leading edge of the pawl since insufficient contact is had between the two parts to afford a driving connection. In some instances, the corner of the pawl is burred over and the corner of the groove of the wheel bushing is rounded to such an extent that the two parts wear and deteriorate rapidly. The present invention provides a means to prevent a partial engagement of the pawl with the grooves of the wheel bushing.

The wheel bushing 4 is provided with an inset plate 30 in one end thereof. The plate 30 is provided with spaced grooves 32 of a conformation, size, and spacing identical to the grooves 7 of the wheel. This plate is normally biased by springs 34 to a position such that its grooves 32 are out of register with the grooves 7 of the wheel 1 by a predetermined distance. The springs 34 are provided in peripheral recesses 35 in the plate and bear at one end against the plate and at their opposite ends against pins 36 projecting from the end surface of the bushing 4. A stop pin 38 working in a peripheral slot 40 of the plate limits the movement of the latter relative to the surface of the wheel bushing.

With the clutch disengaged, as shown in Fig. 2, it will be seen that the surfaces between the grooves 32 of the plate 30 cover substantially half of the grooves 7 in the bushing 4. With the parts in the position shown in this figure, if the operator should trip the latch 18, the time in which the spring 10 could act to rotate the pawl to cause engagement between it and the bushing would be substantially the time required for the groove 7 to pass the leading edge of the pawl 8, since these parts have just overlapped. The pawl will then move into full engagement with the bushing 4, since sufficient time is allowed for its full rotation. However, if the parts have moved to the position shown in Fig. 3, so that the groove 7 has passed nearly half way over the pawl 8, there is insufficient time remaining for the spring 10 to turn the pawl in its seat so that a full engagement will be had between the pawl and the groove 7 of the wheel bushing. Thus, if the latch were tripped at this point, the engagement would be incomplete and the pawl would be unduly stressed by driving on only a part of its surface. However, it will be seen that even if the operator trips the latch at this time, the spring 10 will be unable to turn the pawl in its seat due to the fact that the plate 30 has turned to such a position that the pawl rides on the surface of the plate, even though its leading edge is in registry with the wheel groove. With the parts in this position, the pawl must wait until the next succeeding groove presents itself, at which time the surface of the plate 30 will have passed the pawl and the spring 10 will then be in a position to force the pawl into the next groove 7 and obtain a full engagement of the parts.

The fully engaged position is shown in Fig. 4 and it will be seen that the plate 30 has been moved clockwise so that its grooves 32 register with the grooves 7 of the wheel bushing.

While the overlap between the plate 30 and the wheel bushing is shown as covering half of the area of the grooves 7, it will be appreciated that this overlapping will vary with each type of installation depending on the wheel speed. For example, if the wheel is rotating at such a speed that the groove 7 requires one-tenth of a second to pass the leading edge of the pawl 8, and one-twentieth of a second is required for the spring 10 to rotate the pawl to fully engaged position, the overlap required will be substantially fifty per cent of the groove, since anything less than one-half the width of the slot as a remaining distance of travel would be insufficient to permit full engagement of the parts. However, if the relative speed is such that one-fifth of a second is available between the time the groove 7 first reaches the leading edge of the pawl and the time when the groove passes over such edge, an overlap of only the last fourth of the area of the groove 7 will be required, assuming that the spring acts with the same rapidity.

The clutch hook 16 is shown as having a beveled face 17 which acts as a safety device if the rotation of the parts is reversed. A similar bevel is provided at 19 on one edge of the latch 18 so that the beveled surfaces will cooperate to cam the latch out of the path of the clutch hook when the parts are moving in a backward direction. It will be seen, however, that if the rotation of the fly wheel is reversed while the clutch stands in a disengaged position, it is impossible for the operator to trip the clutch and cause engagement of the pawls with the grooves 7 of the fly wheel. Hence, the beveled surfaces act only when the clutch stands in engaged position and the wheel is started in a backward direction.

While the invention has been described as associated with a particular form of clutch assembly, it is capable of numerous modifications and changes in the form and disposition of the parts. It should be expressly understood that such modifications and changes may be made without departing from the invention as defined in the appended claims.

What I claim is:

1. In a device of the class described, a drive member, a driven member, one of said members having a clutch recess, a clutch element carried by the other of said members and rotatable relative thereto into and out of clutch engagement with said recess, a guard means having a recess therein adapted to register with said clutch recess, and means normally urging said guard means to a position such that its recess is out of register with said clutch recess whereby the latter is covered a predetermined extent, said guard means being moved to the position of registry by an engaging movement of the clutch element into the uncovered area of the clutch recess.

2. In a device of the class described, a drive member, a driven member, said drive member having a clutch recess, a clutch element carried by said driven member and rotatable relative thereto into and out of clutch engagement with said clutch recess, a guard means having a recess therein adapted to register with said clutch recess, and means normally urging said guard means to a position such that its recess is out of register with said clutch recess whereby the latter is covered a predetermined extent, said guard means being moved to the position of registry by an engaging movement of the clutch element into the uncovered area of the clutch recess.

3. In a device of the class described, an outer drive member, an inner driven member, said drive member having a clutch recess, a clutch element carried by said driven member and rotatable relative thereto into and out of clutch engagement with said clutch recess, a guard plate carried by said drive member and having a recess therein adapted to register with said clutch recess, said plate having peripheral slots therein, and means in said slots biasing said plate to a position such that its recess is out of register with said clutch recess whereby the latter is covered a predetermined extent, said guard plate being moved to the position of registry by an engaging movement of the clutch element into the uncovered area of the clutch recess.

4. In a device of the class described a drive member, a driven member, said drive member having a clutch recess, a clutch element carried by said driven member and rotatable relative thereto into and out of clutch engagement with said clutch recess, a guard plate carried by said drive member and having a recess therein adapted to register with said clutch recess, and means normally urging said guard plate to a position such that its recess is partially out of register with said clutch recess whereby the latter is covered a predetermined exent, said guard plate being moved to the position of registry by an engaging movement of said clutch element into the uncovered area of the clutch recess.

OTTO MUELLER.